Patented June 26, 1951

2,557,922

UNITED STATES PATENT OFFICE 2,557,922

REACTION PRODUCT OF A NOVOLAK RESIN AND AN AMINO DIPHENYL-FORMALDEHYDE COMPOUND

Arthur P. Mazzucchelli and Paul F. Urich, Bloomfield, N. J., assignors, by mesne assignments, to Union Carbide and Carbon Corporation, a corporation of New York No Drawing. Application March 7, 1945, Serial No. 581,560

13 Claims. (Cl. 260—38)

1

This invention relates to phenolic compositions primarily intended as binders for mica and similar fillers to yield materials that are moldable into electrical insulators and similar parts requiring good low-loss electrical characteristics. Such compositions that are in commercial use are prepared by the modification of a phenol-formaldehyde condensation product by the inclusion of anhydro-formaldehyde-aniline that also serves as complete or partial hardening agent for the condensation product. They have, however, a number of disadvantages, such as toxicity arising from the volatility of the aniline released by the anhydro-formaldehyde-aniline that interferes with the processing and molding, and the electrical properties of the molded pieces are variable and unstable, particularly when subject to humid conditions over substantial periods of time.

It has now been found most unexpectedly that the replacement by an ortho-amino-diphenyl reacted with formaldehyde for the anydro-formaldehyde-aniline in the preparation of the compositions provides marked improvements in a number of respects. There is an absence of toxicity due to non-volatility; the bulk factor of the molding powder is less, thus contributing to better moldability and denser molded pieces; the molding material is faster setting in a molding operation; the molded pieces have less flexibility on hot discharge, which precludes distortion; and the molded pieces have lower moisture-absorption, better mechanical properties and are markedly improved in power factor and electrical resistance. In general, the mono- and di-amino-diphenyls and amino-diphenyl-methanes alone or as condensation products with formaldehyde can replace anhydro-formaldehyde-aniline, but ortho-amino-diphenyl-formaldehyde condensation products appear outstanding in combining all the foregoing properties.

The invention is more fully set out in the examples that follow.

*Example 1.*—Mono-o-amino-diphenyl crystals were reacted with formaldehyde, the latter in slight excess over equimolecular amounts, no catalyst being used; the proportions of formaldehyde combined with the crystals can be varied from about 0.75 to 1 mole by controlling the reaction period to obtain products ranging from liquids or semi-liquids to solids. In this case the reaction was continued to yield a tacky solid with a low melting point of 56° C. (ball and ring method). Repeating the experiment but including an acid catalyst and long refluxing, however, still gave a tacky, soft product melting at about 67° C. Upon heating the last product to 160° C. with 20 per cent of its weight of a Novolak resin, i. e. a so-called permanently fusible phenol-formaldehyde resin (made for example from one mole of phenol reacted with 0.8 mole of formaldehyde and hydrochloric acid as a catalyst), a further reaction occurred yielding a brittle resinous product with an improved melting point of about 75°–85° C. This product became heat-hardening when mixed with hexa (hexamethylenetetramine) though it was not quite as reactive as an anhydro-formaldehyde-aniline modified phenol-formaldehyde composition, as shown by the addition of 1 gm. of hexa to the following:

| Composition | Gel Time |
|---|---|
| | *Seconds* |
| 10 gms. novolak resin | 50 |
| 7 gms. novolak resin + 3 gms. anhydro-formaldehyde-aniline | 27 |
| 7 gms. novolak resin + 3 gms. o-amino-diphenyl-formaldehyde | 41 |

*Example 2.*—Aqueous formaldehyde in slight excess of equimolecular amount was added to o-amino-diphenyl and the mixture was refluxed with 0.25% (based on the weight of diphenyl) of concentrated hydrochloric acid as catalyst; the reacted mass was dehydrated by heating to 170° C. and bodied by further heating under a vacuum. Upon mixing with 25 per cent of its weight of Novolak resin (as in Example 1) and reacting to 160° C. for 30 minutes, a clear grindable resin melting at 82°–83° C. was obtained; further increases in the Novolak resin tended toward the formation of infusible gels upon continuing the reaction at the temperature of 160° C. A cast slab of the resin had a power factor at 1 megacycle of 0.0017; the Novolak resin alone had a power factor of 0.025.

*Example 3.*—It is not necessary that the reaction take place by first forming a resin by reaction with formaldehyde and then obtaining a brittle product by further reaction with a preformed Novolak resin. A simultaneous reaction was accomplished by mixing 5 moles of phenol and 5 moles of o-amino-diphenyl and slowly adding at 100° C. 11 moles of aqueous formaldehyde (37.5%) containing 0.25% (based on weight of phenol and amino-diphenyl) of concentrated hydrochloric acid; the slow addition was required by the exothermic nature of the reaction. The mass was refluxed for 1.5 hours or until 90 per cent of the formaldehyde was combined. Upon dehydrating to 170° C. and applying vacuum to body the material, a clear grindable resin was obtained with a melting point of 87° C. The amino-diphenyl-formaldehyde content as calculated from the proportions of the reactants used was 64%; actually of course the resin did not contain the amino-diphenyl-formaldehyde condensation product as such.

*Example 4.*—One (1) mole of para-amino-diphenyl was refluxed with 1.25 moles of aqueous formaldehyde (37.5%) in the presence of 0.25% (based on the weight of the diphenyl) of concentrated hydrochloric acid until 1 mole of formaldehyde was combined. The dehydrated condensation product upon reaction with 30% of the novolak resin as in Example 2 had a melting point of 77° C. and a calculated amine content of 77%.

*Example 5.*—One (1) mole of 4,4'-diamino-diphenyl (benzidine) was refluxed in a kneader with 2.5 moles of aqueous formaldehyde (37.5%) in the presence of 0.25% of concentrated hydrochloric acid until 2 moles of the formaldehyde were combined. On dehydration a solid having a melting point of 228° C. was obtained; it was insoluble in novolak resin.

*Example 6.*—The condensation product of Example 5 reacted readily with sufficient phenol present in excess of molar proportions at 150°–190° C. to yield a complex having in combination about 2 moles of phenol for each mole of the benzidine-formaldehyde compound. The complex product was compatible with the novolak resin; the proportions used gave a calculated benzidine-formaldehyde content of 57.7%.

*Example 7.*—A condensation product of formaldehyde with 4,4'-diamino-diphenyl-methane was prepared in substantially the manner described in Example 5 to give a solid having a very high melting point of 302° C. and insoluble in the novolak resin.

*Example 8.*—The product of Example 7 was reacted with phenol as in Example 6 to yield a complex reaction product comprising 2 moles of phenol per mole of the condensation product calculated as dimethylol-diamino-diphenyl-methane after the unreacted phenol was removed. The product was compatible with the novolak resin; upon reaction with the novolak resin as in the preceding, a product was obtained having a calculated modifier content by weight of 46.4% and a melting point of 101° C.

*Example 9.*—For comparison there was prepared a condensation product of 1 mole each of aniline and phenol with 1.3 moles of formaldehyde; no catalyst was used. The unreacted phenol and formaldehyde were removed by distillation. The product gave a calculated content of 44.3% of the aniline-formaldehyde product, and it had a melting point of 95° C.

*Example 10.*—Also for comparison, a product of novolak resin and anhydro-formaldehyde resin as a modifier, adjusted to the proportion of 42.8 parts of the aniline compound to 100 parts of novolak resin, was made; it had a melting point of 138° C. This was an unreacted mixture.

Molding materials were prepared from the products of the foregoing examples by admixing the products with filler, hardening agent, lime, lubricant, pigment, etc.; these ingredients can be varied as to nature and proportion. Included in the mixture were also sufficient added amounts of novolak resin to adjust the amount of modifier to 42.8 parts for each 100 parts of novolak.

For high frequency insulation subject to high humidity, the filler is preferably mica, anthophyllite variety of amphibole asbestos, and alumina. Alumina gives brittle molded pieces, but electrically it is satisfactory.

The proportion of modifier, i. e. amino-diphenyl-formaldehyde, to novolak or other phenolic resin generally determines the properties of the molded pieces. But since flexibility, electrical characteristics, moisture-resistance and heat distortion, as well as moldability of the material, do not vary to the same degree or extent with the amount of modifier there is an optimum range for attaining a proper balance; for instance, amounts of the order of 200%, based on the weight of novolak resin modified thereby, have poor moldability but the molded pieces are very good electrically. As a rule the most satisfactory molding materials, taking into consideration all factors, are those having present from 10 to 60% based on the weight of the novolak resin; but any amount up to 200% is useful. As before indicated, the amount of novolak resin reacted by heating at 160° C. with the modifier to make a brittle resin is limited in the case of o-amino-diphenyl to about 40% of the weight of the modifier due to the hardening action of the modifier; additional novolak resin is mechanically admixed in making the molding material.

The amino-diphenyl-formaldehyde resins partake of the nature of hardening agents for the novolak resins or other reaction products with which they are incorporated; but hardening speed is accelerated by the addition of paraform or hexa without deleterious effect on the electrical properties of the molded pieces. The amount of hardening agent added also affects the properties of the molded pieces and particularly the electrical characteristics. An increase in the percentage of hexa, based on the weight of total resin, from 3 to 16% has a corresponding adverse effect on electrical properties of molded pieces when tested soon after molding. On the other hand, low percentages of hexa make the moldability of the material difficult and the water resistance of molded pieces is comparatively so poor that the good electrical properties disappear in time through moisture absorption.

For comparative purposes molding materials were made by adding to novolak resin alone and to the novolak resin-modifier combinations of the foregoing examples (modified by novolak addition to the ratio of 42.8 parts of modifier to 100 parts of resin) 10% of hexa, and about 3% of lime and lubricant. These were ball-milled together and then the mixture was blended with powdered mica as a filler in the ratio of 62 parts by weight of mica to 38 parts of the mixture. The whole was passed through differential rolls at about 110°–125° C. for several minutes to the desired plasticity for molding, and the sheets so formed were ground to powder. For molding the powder was preformed and the preforms heated in an oven for 30 minutes at 85°–95° C. to eliminate any moisture. The preforms were molded into test pieces in molds heated to about 160° C. and under applied pressures of 2000–5000 p. s. i., and the pieces were discharged hot from the molds. The molded pieces were then tested for their properties. Tests for power factor, loss factor and water absorption were made in the conventional (A. S. T. M.) manner but using molded discs $\frac{1}{8}$ inch thick and 4.25 inches in diameter; the D. C. insulation resistance was measured by using a 2 inch diameter disc having two $\frac{1}{2}$ inch diameter brass inserts molded therein with their centers one inch part. The data obtained is condensed in the following table.

Table I

| a | b | c | d Power Factor | | e Loss Factor | | f D. C.—Resistance | |
|---|---|---|---|---|---|---|---|---|
| Mold. M. of— | Flow | Per Cent H₂O 14 d. | Molded | 14 d. H₂O | Molded | 14 d. H₂O | 2 d. H₂O | 14 d. H₂O |
| novolak | 0.80 | 0.55 | 0.0096 | 0.0216 | 0.049 | 0.113 | 2.5×10⁴ | 2.5×10³ |
| ex. 10 | 0.32 | 0.37 | 0.0079 | 0.0205 | 0.037 | 0.100 | 1.4×10⁵ | 1.0×10⁴ |
| ex. 9 | 0.66 | 0.29 | 0.0097 | 0.0180 | 0.046 | 0.089 | 3.2×10⁴ | 1.9×10⁴ |
| ex. 2 | 0.75 | 0.26 | 0.0069 | 0.0141 | 0.033 | 0.068 | 5×10⁵+ | 1.0×10⁵ |
| ex. 3 | 0.80 | 0.24 | 0.0062 | 0.0164 | 0.029 | 0.079 | 5×10⁵+ | 2.0×10⁵ |
| ex. 4 | 0.77 | 0.58 | 0.0062 | 0.0444 | 0.028 | 0.238 | 7.3×10⁴ | 1.1×10² |
| ex. 7 | 0.08 | 0.61 | 0.0077 | 0.0274 | 0.037 | 0.138 | 5.3×10⁴ | 2.1×10³ |
| ex. 8 | 0.67 | 0.33 | 0.0094 | 0.0245 | 0.045 | 0.125 | 1.5×10⁵ | 7.3×10³ |
| ex. 5 | 0.10 | 0.48 | 0.0087 | 0.0208 | 0.042 | 0.160 | 1.1×10⁵ | 1.1×10⁴ |
| ex. 6 | 0.60 | 0.42 | 0.0096 | 0.0249 | 0.047 | 0.128 | 1.0×10⁶ | 2.1×10⁴ | a = molding material having for binder product listed.
b = flow in inches as obtained in a Rossi-Peakes flow tester at 500 p. s. i.
c = per cent water absorption by volume after 14 days in water at 50° C.
d = power factor measured at time of molding and after 14 days immersion in water at 50° C.
e = loss factor at time of molding and after 14 days immersion in water at 50° C.
f = D. C. insulation resistance in megohms at 85° C. after 2 days and 14 days immersion in water; at the time of molding it was over 5×10⁵ in all cases.

From Table I it is to be observed that the resin incorporating o-amino-diphenyl (Example 2) is markedly superior to the resins having other modifiers in moisture resistance, electrical properties, and retention of electrical properties, after immersion in water; in comparison the unmodified resin and the aniline-containing resins lose their electrical properties rapidly after immersion. The other modifiers in general show substantial equivalence in some properties and superiority in others when compared with the aniline-modified and unmodified resins. The marked superiority of the ortho over the para-amino-diphenyl-formaldehyde resin indicates that the para derivatives are not as reactive.

The superiority of the ortho-amino-diphenyl-formaldehyde over the unmodified and the anhydro-formaldehyde-aniline resins can be further demonstrated by comparing compositions formulated so that the pieces molded therefrom have substantially the same electrical properties when tested immediately after molding and then observing deterioration in electrical properties upon immersion in water at 50° C. The following results were noted:

| | Ortho-amino-diphenyl-CH₂O | Anhydro-formaldehyde-aniline | Unmodified |
|---|---|---|---|
| Power Factor—1 megacycle: | | | |
| As molded | 0.007 | 0.007 | 0.010 |
| After 1,200 hrs. immersion | 0.024 | 0.135 | 0.075 |
| After 3,600 hrs. immersion | 0.053 | 0.200 | 0.200 |
| Volume Resistance—Megohms: | | | |
| As molded | 1.2×10⁶ | 1.2×10⁶ | 1.2×10⁶ |
| After 1,200 hrs. immersion | 7.5×10⁵ | 45 | 1,000 |
| After 3,600 hrs. immersion | 2.0×10⁵ | 50 | 70 |

The following Table II compares the properties obtained with molding material formulations in which only 3% and 6% hexa in place of 10% hexa based on the resin-modifier combination is used. The series includes the use of ortho-amino diphenyl crystals as well as the ortho-amino-diphenyl-formaldehyde resin. An unmodified molding material containing 10% hexa based on the resin is also included for comparative purposes, it having been found very difficult to mold such a material with substantially lower hexa content; this is understandable since the amine modifiers act as partial hardeners for the novolak resin.

Table II

| | A | B | C | D | E |
|---|---|---|---|---|---|
| Novolak resin | 34.0 | 20.0 | 20.0 | 22.8 | 22.8 |
| Anhydro-formaldehyde-aniline | | 14.0 | | | |
| o-amino-diphenyl-formaldehyde | | | 14.0 | 11.2 | |
| o-amino-diphenyl-crystals | | | | | 11.2 |
| Hexa | 3.4 | 1.0 | 1.0 | 2.0 | 2.0 |
| Lubricant | 2.5 | 2.5 | 2.5 | 2.5 | 2.5 |
| Mica | 60.1 | 62.5 | 62.5 | 61.5 | 61.5 |
| Percent water absorption by volume of a 2″ disc: | | | | | |
| Immersion 144 hrs. cold H₂O | 0.125 | 0.21 | 0.23 | 0.05 | 0.64 |
| Immersion 5 hrs. boiling H₂O | 1.02 | 0.93 | | 1.17 | 0.75 |
| Power factor—1 megacycle | 0.0096 | 0.0066 | 0.0044 | 0.0045 | 0.0051 |
| Loss factor—1 megacycle | 0.048 | 0.030 | 0.020 | 0.021 | 0.023 |
| Special test—Power factor at 300 kilocylces/sec. at 25° C. on molded bowl: | | | | | |
| As molded | 0.0088 | 0.0060 | 0.0038 | 0.0036 | 0.0045 |
| After 10 min. bake at 365° F. | 0.0125 | 0.0064 | 0.0049 | 0.0044 | |
| After 24 hrs. immersion in H₂O following above bake | 0.0159 | 0.0147 | 0.0081 | 0.0051 | 0.0051 |

The results shown in Table II demonstrate the advantageous properties of using ortho-amino-diphenyl crystals over anhydro-formaldehyde aniline. However, it is more difficult to process the molding material when using the crystals than when incorporating its reaction product with formaldehyde. For example, it takes four minutes to form a sheet on the rolls when compounded, and it is difficult to control plasticity, whereas the equivalent resin modified material forms a strong solid sheet which compounds easily within 30 seconds; furthermore the latter is practically non-volatile and odorless. Nevertheless this experiment indicates the practicability of using the various amino-diphenyls per se as well as the condensation products with formaldehyde.

The amino-diphenyls include the various substituted and unsubstituted mono- and di-amino-diphenyls having more than one phenyl group, and the mono- and di-amines of diphenyl methane. Usable compounds can be prepared by condensation with other aldehydes than formaldehyde and its polymers as acetaldehyde, benzaldehyde, etc., or in general any methylene-engendering compound. Other phenols besides phenol itself can be included as a reactant in forming the complexes. Although of particular benefit when used in mineral-filled molding compositions in combination with novolaks, they are also useful with one-step phenolic resins with or without added hexa. The amino-diphenyls, etc. or their formaldehyde-reaction products may be used for improving the electrical properties of cellulose-filled phenolic resin materials, and various cast and laminated products. Hardening agents comprise formaldehyde and its polymers, hexa and similar derivatives supplying mobile methylene groups. Finally they may be useful as plasticizers for phenolic and other type resins for increasing plasticity and flexibility.

What is claimed is:

1. Process for preparing a resinous product which comprises condensing a mole of o-aminodiphenyl with from 0.75 to 1.0 mole of formaldehyde, and incorporating with said condensate product an acid-catalyzed novolak resin of phenol per se and formaldehyde, in the ratio of from 10 to 200 per cent by weight of the product to each part of the novolak resin.

2. Process of preparing moldable material which comprises condensing a mole of a diphenyl compound from the class consisting of diphenyls and diphenyl-methanes having from one to two primary amino radicals as the sole reactive substituents on the phenyl nuclei with from 0.75 to 1.0 mole of formaldehyde per amino radical, and incorporating with said condensate product an acid-catalyzed novolak resin of phenol per se and formaldehyde, in the ratio of from 10 to 200 per cent by weight of the product to each part of the novolak resin, and mixing a filler with the modified novolak resin.

3. Process of preparing moldable material which comprises condensing a mole of o-aminodiphenyl with from 0.75 to 1.0 mole of formaldehyde, and incorporating with said condensate product an acid-catalyzed phenol-formaldehyde novolak resin of phenol per se and formaldehyde, in the ratio of from 10 to 200 per cent by weight of the product to each part of novolak resin, and mixing a filler with the novolak modified condensate product.

4. Reaction product of an acid-catalyzed novolak resin of phenol per se and formaldehyde and a condensation product of formaldehyde and diphenyl compound from the class consisting of diphenyls and diphenyl-methanes having from one to two primary amino radicals as the sole reactive substituents on the phenyl nuclei in the ratio of 0.75 to 1.0 mole formaldehyde per amino radical, the condensation product constituting from 10 to 200 per cent by weight for each part of the novolak resin.

5. Reaction product of an acid-catalyzed novolak resin of phenol per se and formaldehyde and of a condensation product of formaldehyde and o-amino-diphenyl in the ratio of 0.75 to 1.0 mole formaldehyde per amino radical, the condensation product constituting from 10 to 200 per cent by weight for each part of the novolak resin.

6. Molding composition comprising a filler and a resinous reaction product of an acid-catalyzed novolak resin of phenol per se and formaldehyde, and of a condensation product of formaldehyde and a diphenyl compound from the class consisting of diphenyls and diphenyl-methanes having from one to two primary amino radicals as the sole reactive substituents on the phenyl nuclei in the ratio of 0.75 to 1.0 mole formaldehyde per amino radical, the condensation product constituting from 10 to 200 per cent by weight for each part of the novolak resin.

7. Molding composition comprising a filler and a resinous reaction product of an acid-catalyzed novolak resin of phenol per se and formaldehyde and of a condensation product of formaldehyde and o-amino-diphenyl in the ratio of 0.75 to 1.0 mole formaldehyde per amino radical, the condensation product constituting from 10 to 200 per cent by weight for each part of the novolak resin.

8. Molding composition of a filler comprising mica and a resinous reaction product of an acid-catalyzed phenol-formaldehyde novolak resin of phenol per se and formaldehyde and of a condensation product of formaldehyde and a diphenyl compound from the class consisting of diphenyls and diphenyl-methanes having from one to two primary amino radicals as the sole reactive substituents of the phenyl nuclei in the ratio of 0.75 to 1.0 mole formaldehyde per amino radical, the condensation product constituting from 10 to 200 per cent by weight for each part of the novolak resin.

9. Molding composition of a filler comprising mica and a reaction product of an acid-catalyzed novolak resin of phenol per se and formaldehyde and a condensation product of formaldehyde with o-amino-diphenyl in the ratio of 0.75 to 1.0 mole formaldehyde per amino radical, the condensation product constituting from 10 to 200 per cent by weight for each part of the novolak resin.

10. Process of preparing a resinous product which comprises condensing a mole of a diphenyl compound from the class consisting of diphenyls and diphenyl-methanes having from one to two primary amino radicals as the sole reactive substituents on the phenyl nuclei with from 0.75 to 1.0 mole of formaldehyde per amino radical, and incorporating with said condensate product an acid-catalyzed novolak resin of phenol per se and formaldehyde, the proportion of condensation product to novolak resin being between 10 per cent and 200 per cent on the weight of the novolak resin.

11. Process of preparing a resinous product which comprises condensing a mole of a diphenyl compound from the class consisting of diphenyls and diphenyl-methanes having from one to two primary amino radicals as the sole reactive substituents attached to the phenyl nuclei with from 0.75 to 1.0 mole of formaldehyde per amino radical, reacting the condensation product with up to about 40% of its weight of an acid-catalyzed novolak resin of phenol per se and formaldehyde until a fusible, brittle resin is obtained.

12. Process of preparing a resinous product which comprises condensing a mole of a diphenyl compound from the class consisting of diphenyls and diphenyl-methanes having two primary amino radicals as the sole reactive substituents attached to the phenyl nuclei with from 0.75 to 1.0 mole of formaldehyde per amino radical, reacting the resultant condensation product with phenol in excess of molar proportions and up to about 2 moles per mole of the condensation product calculated as a dimethylol-diamino diphenyl compound until a resinous complex product compatible with novolak resin is obtained, and incorporating a novolak resin of phenol per se and formaldehyde in the complex product, the latter being between 10 per cent and 200 per cent on the weight of the novolak resin.

13. A heat-hardenable resinous mixture comprising a reaction product of an acid-catalyzed novolak resin of phenol per se and formaldehyde and a condensation product of a mole of o-aminodiphenyl with from 0.75 to 1.0 mole formaldehyde in amount between 10 and 200 per cent by weight of the novolak resin, and hexamethylenetetramine in amount between 3 and 16 per cent by weight of the mixture.

ARTHUR P. MAZZUCCHELLI.
PAUL F. URICH.

REFERENCES CITED

The following references are of record in the file of this patent:

UNITED STATES PATENTS

| Number | Name | Date |
|---|---|---|
| 1,228,428 | Goldsmith | June 5, 1917 |
| 1,429,267 | Achtmeyer | Sept. 19, 1922 |
| 1,591,688 | Spalding | July 6, 1926 |
| 1,982,486 | Schlingman | Nov. 27, 1934 |
| 2,014,953 | Schlingman et al. | Sept. 17, 1935 |
| 2,178,536 | Clifford | Nov. 7, 1939 |
| 2,432,544 | Rhodes | Dec. 16, 1947 |

FOREIGN PATENTS

| Number | Country | Date |
|---|---|---|
| 401,535 | Great Britain | Nov. 16, 1933 |

OTHER REFERENCES

Ellis: "The Chemistry of Synthetic Resins," vol. 1, pp. 686, 687, pub. 1935, by Reinhold Pub. Corp., N. Y.